United States Patent
Kane et al.

[15] 3,658,480
[45] Apr. 25, 1972

[54] COAGULATION TIMING APPARATUS, AND METHOD

[72] Inventors: Gerald J. Kane, North Wales; Eugene J. Weatherby, Perkasie, both of Pa.

[73] Assignee: Bio/Data Corporation, Norristown, Pa.

[22] Filed: Apr. 13, 1970

[21] Appl. No.: 27,582

[52] U.S. Cl..............................23/230 B, 23/253, 73/64.1, 356/39
[51] Int. Cl. ......................................................G01n 33/16
[58] Field of Search..........................23/230 B, 253; 73/64.1; 356/39

[56] References Cited

UNITED STATES PATENTS 3,458,287  7/1969  Gross et al. ..........................73/64.1 X

*Primary Examiner*—Morris O. Wolk
*Assistant Examiner*—R. M. Reese
*Attorney*—Seidel, Gonda & Goldhammer

[57] ABSTRACT

Apparatus for determining various blood coagulation times removes inaccuracies of prior apparatus by blanking first derivative signal for part of the coagulation time and then only comparing a component of said signal to a preset level to determine the clotting time.

10 Claims, 5 Drawing Figures

Patented April 25, 1972

INVENTORS
GERALD J. KANE
EUGENE J. WEATHERBY

BY

*Seidel, Gonda & Goldhammer*

ATTORNEYS

Patented April 25, 1972

INVENTORS
GERALD J. KANE
EUGENE J. WEATHERBY
BY
Seidel, Gonda & Goldhammer
ATTORNEYS

INVENTORS
GERALD J. KANE
EUGENE J. WEATHERBY

BY
Seidel, Gonda; Goldhammer

ATTORNEYS

COAGULATION TIMING APPARATUS, AND METHOD

This invention relates to an apparatus and method for measuring various blood coagulation times. More particularly, this invention relates to an automatic blood or plasma coagulation timing apparatus and method for determining the blood clotting time.

The measurement of prothrombin and other blood or plasma coagulation times are well known laboratory procedures. Prothrombin time is determined by mixing known quantities of blood plasma with certain reagents and measuring the elapsed time between the mixing of the solution and the commencement of clot formation. There are several uses for the test as explained in the literature. For example, it is particularly desirable to know the blood clotting time of persons under anti-coagulant therapy. The prothrombin time of the blood of individuals under such therapy must be closely regulated both initially to determine the correct dosage and throughout the treatment to detect possible changes.

There are several other well known types of tests and procedures involving the coagulation of blood or plasma. Such tests have in common the singular fact that they all end in the coagulation or clotting of blood.

The present invention is therefore directed to an apparatus and method for measuring the coagulation time in such tests. The precise laboratory tests are not described in detail as they are well known to those skilled in the art. It should be sufficient to simply refer to two tests which differ primarily by the type of anti-coagulant in the plasma prior to the addition of a neutralizing reagent. When blood is drawn from a patient, it is drawn into either a citrated or an oxalated anti-coagulant. The mixture of blood and anti-coagulant is converted into a plasma. Thereafter, it is tested to determine its coagulation time. The reagent voids or neutralizes the effect of the blood's anti-coagulant. One such test is the oxalate test because the anti-coagulant includes sodium oxalate. The other test may be referred to as the citrate test because of its use of citrated compounds.

There are several known devices for measuring coagulation times. Among these are the devices described in U.S. Pat. No. 3,307,392 issued to Charles A. Owen et al. and U.S. Pat. No. 3,458,287 issued to William Gross et al. U.S. Pat. No. 3,307,392 describes a rather rudimentary light sensitive electronic circuit for measuring prothrombin time by determining the first differential of a signal proportional to the light transmitted through the mixture of blood and reagent. The device described in that patent depends upon the ability of the described circuit to sense when the first derivative signal proportional to the amount of light transmitted through the blood reaches a minimum, or reaches a maximum after a first minimum.

The prothrombin apparatus described in U.S. Pat. No. 3,458,287 carries the concept set forth in U.S. Pat. No. 3,307,392 to its logical conclusion. Thus, it measures the second derivative of a signal proportional to the amount of light transmitted through the blood, and measures when this second derivative signal changes sign. The apparatus described in both U.S. Pat. Nos. 3,307,392 and 3,458,287 suffer from certain serious limitations. It is clear from examining the graph illustrated in these patents that the time constants of the exponential curves are extremely large. By the same token the time when the differential signal actually reaches a maximum (or minimum) is relatively indefinite due to the slow change in the slope of the curve. Taking the second differential as in U.S. Pat. No. 3,458,287 is a step toward solving the problem because it is relatively straightforward to determine when the slope of the curve changes value from negative to positive. This approach, however, reduces the reliability in the measurement of the clotting time. For example, U.S. Pat. No. 3,307,392 makes it clear that coagulation time is not precisely known. Thus, the patent points out that the end point can be measured either as the time when the first differential reaches a minimum value, or it can be measured when the first differential reaches a maximum after having reached a first minimum. It also is known that coagulation (sometimes referred to as end point time) can be somewhere in between the minimum and maximum values. Thus, coagulation time is actually a range of values and the selection of the particular value within that range is left open to choice by the analyst.

The present invention seeks to avoid the inadequacies of devices constructed according to U.S. Pat. Nos. 3,307,392 and 3,458,287 by retaining the selectivity of a first differential device while at the same time increasing accuracy and reliability in the measurement. In accordance with the present invention neither the first nor the second differential is used to measure coagulation time. Rather, a component of the first differential is derived for comparison with a preselected value.

It therefore is an object of the present invention to provide a new and unobvious coagulation timing apparatus, and method which is much more reliable than previous known apparatus for the same purpose. Previous apparatus is particularly unreliable when used to determine coagulation time over extended period; e.g., 30 seconds. Other prior art devices fail to consider the extremely long time constants from the signals being measured. As a result, such circuits lack the requisite sensitivity and are inaccurate.

The present invention provides a coagulation timing apparatus which is much more sensitive. For example, existing apparatus indicates clotting times of 11 to 15 seconds for normal blood plasma. Because the present invention is so much more sensitive, it indicates clotting times for the same blood at $10 \pm 0.5$ seconds from the low end of the range. This is because the apparatus has a higher sensitivity and is able to determine the beginning of the formation of the blood clot at its insipiencey.

For the purpose of illustrating the invention, there is shown in the drawings a form which is presently preferred; it being understood, however, that this invention is not limited to the precise arrangements and instrumentalities shown.

Figure 1:
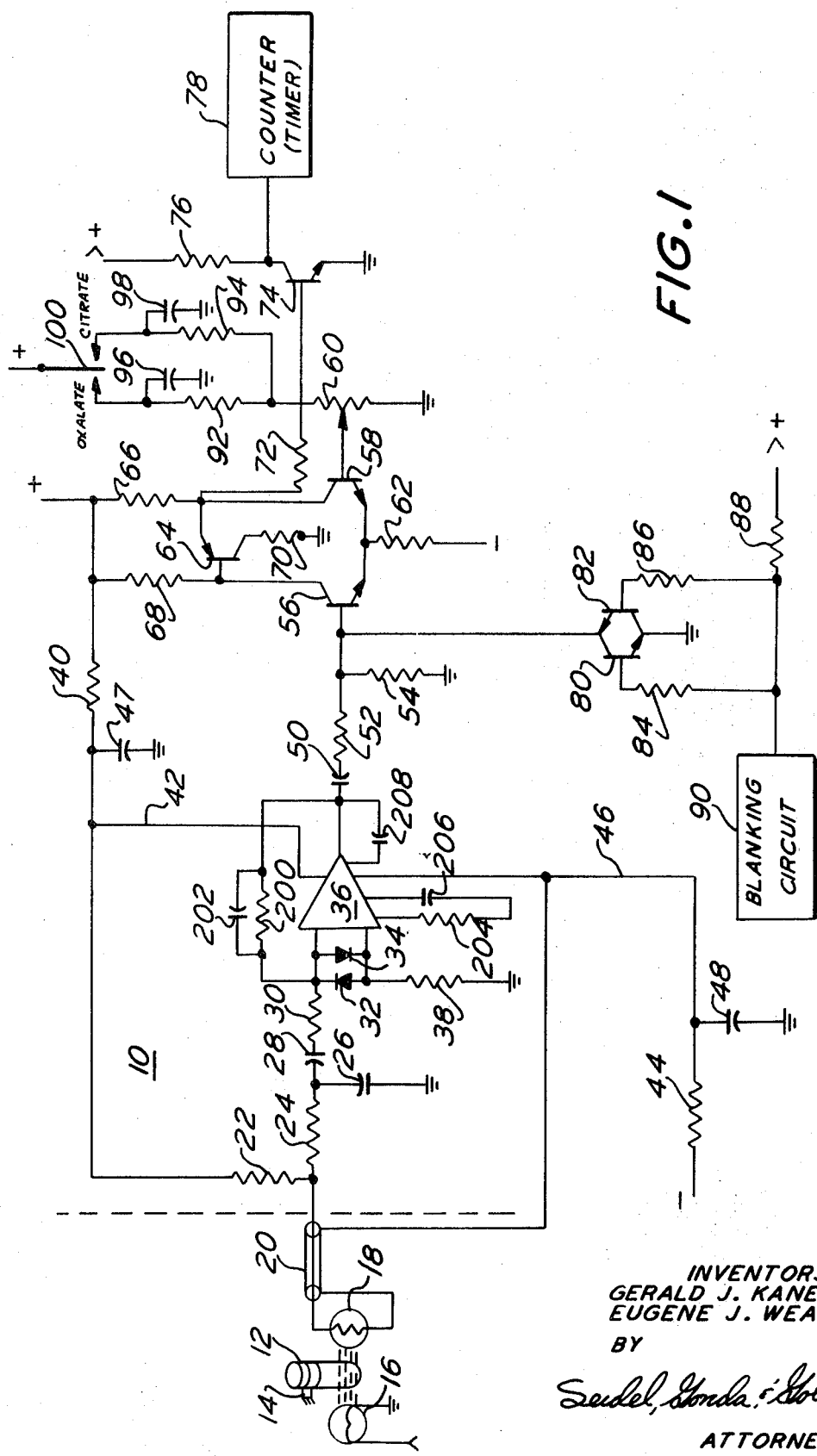
FIG. 1 is a schematic circuit diagram of a preferred means for carrying out the present invention.
Figure 2:
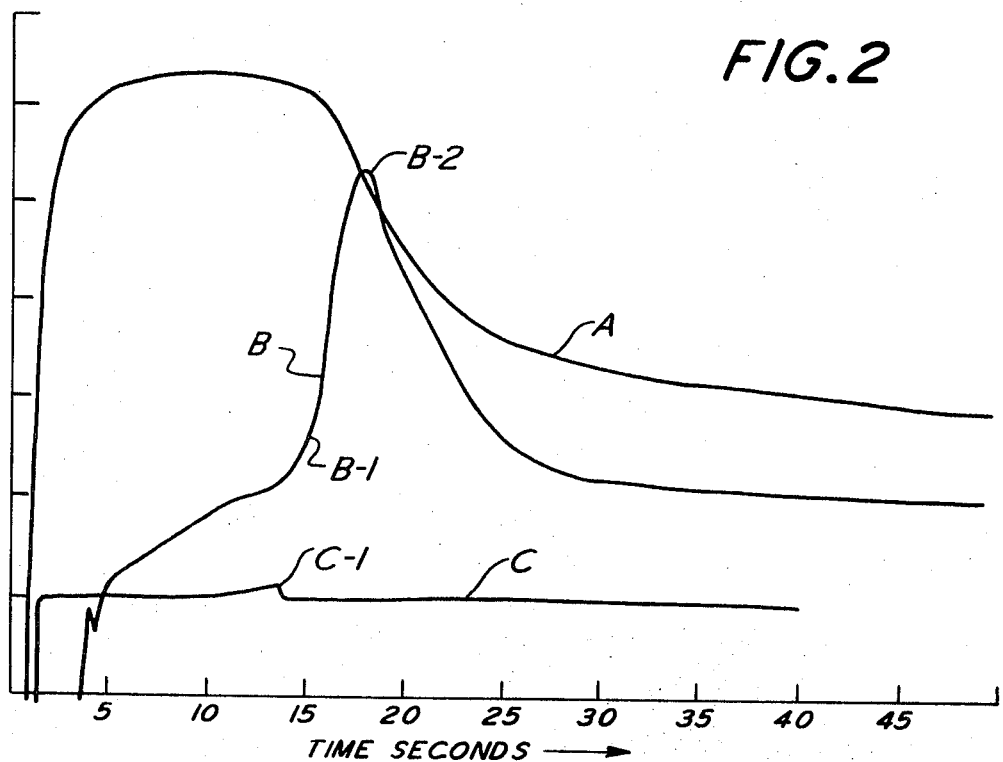
FIG. 2 is a graph illustrating electrical values generated in the circuit of FIG. 1.
Figure 3:
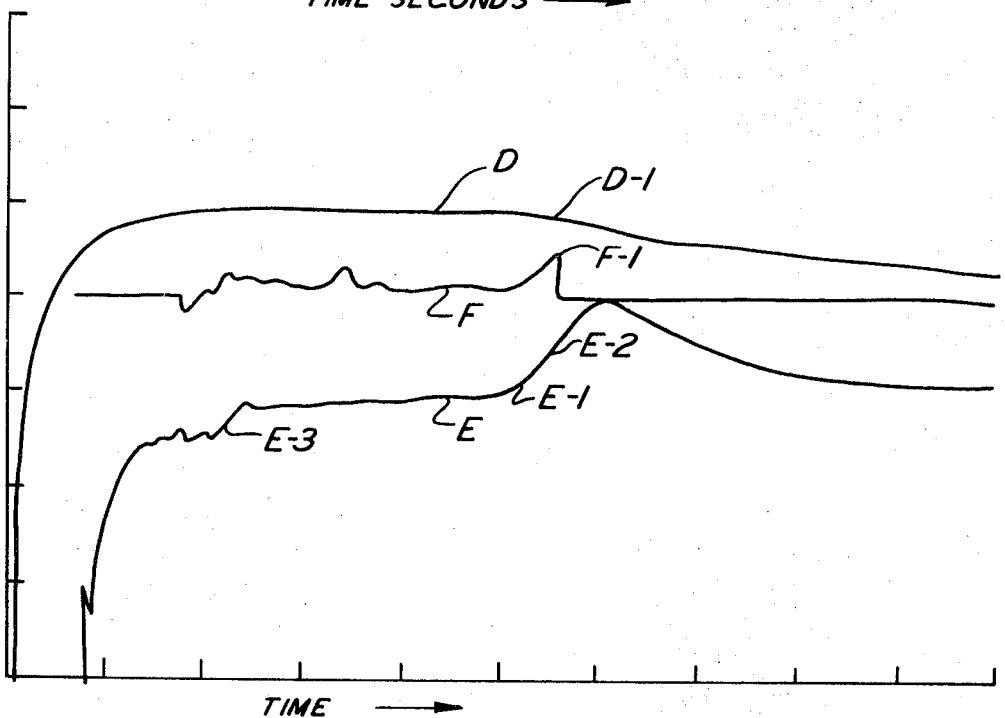
FIG. 3 is a graph illustrating electrical values generated in the circuit of FIG. 1.

Referring now to FIGS. 2 and 3 of the patent application, there are shown two graphs illustrating the various signals which may be developed in the circuit illustrated in FIG. 1. These graphs best illustrate the underlying concept of the present invention.

FIG. 2 graphically illustrates curves which may be generated by the circuit illustrated in FIG. 1 when the test is made on plasma having an oxalate anticoagulant. Each curve on the graph represents a plot of voltage versus time made on a strip chart recorder. The plot marked A represents the output of a photosensitive device such as a photoresistor which generates a voltage signal proportional to the quantity of light incident upon it. Ignoring the first portion of the curve A, it is apparent that it has a slow, smooth rise for a certain amount of time. Then it reverses and rapidly decreases. Then the slope reverses again to become asymptomtic to a fixed level. In both cases the changes in the slope of the curve A are relatively smooth with the first reversal being indicative of the clotting time and occurring at about 13.6 seconds.

The curve B represents the first derivative of the curve A. This shows that the end point time indicated by changes in the slope of the curve of the first derivative (B–1 and B–2 in FIG. 2) are smooth rather than abrupt. This is particularly true of the point noted as B–1 in FIG. 2. These points are therefore rather difficult to accurately measure. Curve C in FIG. 2 represents the output voltage of the circuit of FIG. 1, and is discussed in detail below. The end point time is indicated at C–1. It should be noted that this end point time is rather abrupt in comparison to the end point time indicated by curve B at B–1. The scale of the ordinate for curves B and C is identical. Of course, the time scale for all three curves (A, B and C) is the same.

FIG. 3 contains the same curves as those developed for FIG. 2 except that these curves plot the result of adding reagent to citrated blood plasma. In this case the problem is even greater than that encountered with an oxalate plasma. As shown, the curve D representing the output of the photocell is substantially smoother and so are the changes in the voltage levels indicative of clotting such as at D-1. Because of the smoothness of the curve D, the curve E also is quite smooth even at the points E-1 and E-2 which indicate the end point time. Moreover, curves such as D and E are much more prone to reflect interference (noise) in the electrical circuitry as well as other disturbances caused by turbulence, as indicated in the early portion of the curves. Thus, reading the first derivative of a citrate curve of optical density is quite difficult.

The curve F represents the output of the circuit illustrated in FIG. 1. It will be noted that the end point time F-1 is quite sharp and pronounced in comparison with the points E-1 and E-2 therefore making it substantially easier to read and/or detect.

Referring now to FIG. 1, there is illustrated a circuit for detecting the curves C and F and measuring coagulation time.

As shown, a test tube 12 or other container for a mixture of plasma and reagent is positioned by any conventional means such as the bracket 14 between a source of electromagnetic energy 16 (preferably light) and an electromagnetic transducer 18 (preferably a photoelectric device). In the preferred embodiment, the source 16 is an incandescent lamp and the transducer 18 is a photoresistor. The light source 16 and transducer 18 are properly matched so as to produce an appropriate response. The curves A and B represent the voltage output of the photocell 18. This voltage output is connected into the circuitry 10 by any conventional means such as the coaxial cable 20.

The voltage output signal developed from the photocell 18 and resistor 22, connected to the positive side of a direct current voltage supply, is filtered of AC noise and hum by resistor 24 and capacitor 26. The signal at capacitor 26 is differentiated in a differentiating circuit which includes resistor 200 and capacitor 28. As shown capacitor 28 and resistor 30 are connected to back-to-back diodes 32 and 34 which in turn are connected through resistor 38 to ground. Resistor 30 and capacitor 202 along with resistor 204 and capacitors 206 and 208 limit the high frequency gain of the amplifier configuration. The manner in which the above described circuit functions as a differentiating circuit is well known and need not be described in detail. It is sufficient to point out that the voltage signal which appears across the input terminals of the operational amplifier 36 is the first differential of the voltage versus time curves developed by the photocell 18.

As shown, power for the amplifier 36 is provided from the positive terminal of a direct current power supply (not shown) through resistor 40 and conductor 42. The negative terminal of the direct current power supply is connected through resistor 44 and conductor 46 to the operational amplifier 36. Appropriate alternating current grounding means in the form of capacitors 47 and 48 are provided as shown. The operational amplifier 36 is provided with conventional feedback and control circuitry which, therefore, need not be described in detail. A high gain is necessary because the time constant of the signal is so large that the differentiating circuit greatly attenuates the signal. The amplifier 36 also provides a good linear gain for the differentiated signal.

The amplified and time changing output voltage of operational amplifier 36 is coupled through capacitor 50 and appropriate limiting resistors 52 and 54 to the base of transistor 56. The purpose of capacitor 50 is to remove the DC portion of the output signal of amplifier 36. Thus, the amplifier 36 due to its input effect characteristic has a ± 1 volt direct current level which must be removed. For this reason, the signal is capacitively coupled into the base of transistor 56. Transistor 56 forms one half of a difference amplifier whose function is to amplify the input signal. The other half of the amplifier consists of transistor 58 whose base is connected to potentiometer 60. Potentiometer 60 provides a reference voltage level against which the signal coupled from amplifier 36 is matched.

The emitters of transistors 56 and 58 are commonly connected through resistor 62 to the negative terminal of the power supply. The collector of transistor 56 is connected to the base of transistor 64. The collector of transistor 58 is connected to the emitter of transistor 64. The collector of transistor 58 is also connected through resistor 66 to the positive terminal of the power supply. The base of transistor 64 is connected through resistor 68 to the positive terminal of the power supply. The collector of transistor 64 is connected through resistor 70 to ground. The emitter of transistor 64 is connected in series to resistor 72 to the base of transistor 74.

The circuitry described immediately above measures the difference in voltage levels at the bases of transistors 56 and 58. When the voltage at the base of transistor 56 becomes greater than the preselected voltage level at the base of transistor 58, transistor 64 biases transistor 74 into a conducting condition. When the voltage level at the base of transistor 56 is less than the voltage level at the base of transistor 58, transistor 64 biases transistor 74 off. Thus, transistor 74 is normally biased into a non-conducting or off condition by transistor 64 which in turn is controlled by the voltage differences applied to the difference amplifier. Transistor 64 is biased so as to saturate quickly when the voltage level at the base of transistor 56 is greater than the voltage level at the base of transistor 58. This in effect converts the difference signal into a square wave. Such a square wave signal is advantageous because of its quick rise time which can be used to trigger timing circuits as explained below.

The emitter of transistor 74 is connected to ground as shown. The collector is connected through resistor 76 to a direct current source of voltage which in the preferred embodiment is somewhat lower than the primary supply voltage provided to the amplifier 36, as indicated.

The turning on of transistor 74 generates a voltage pulse which is applied to a flip-flop circuit in counter 78. Counter 78 is preferably a digital counter which is set in operation when a reagent is added to test tube 12. Thus, counter 78 indicates the amount of time expired until the voltage applied to the base of transistor 56 rises above a predetermined level. As explained below, this amount of time is the end point or coagulation time. It should be understood that the counter 78 is but one example of a number of timing devices which may be used. For example, a strip chart recorder could be substituted for the counter and the control circuitry thereof.

As shown, the base of transistor 56 is also connected to the collector-emitter junction of back-to-back connected transistors 80 and 82 which form a solid state switch. The other collector-emitter junction of the transistors 80 and 82 is connected to ground. The bases of transistors 80 and 82 are connected through like resistors 84 and 86 to one terminal of resistor 88. Resistor 88 is in turn connected to a positive terminal of the power supply at a somewhat lower voltage than the voltage applied to amplifier 36. Resistors 84 and 86 are also connected to a blanking circuit 90 which, when energized, combines with the voltage from the power supply to saturate the transistors 80 and 82 and thus ground the base of transistor 56.

The blanking circuit 90 generates a blanking voltage to saturate transistors 80 and 82 for a predetermined amount of time and then shuts down so as to remove that voltage. Upon removal of the blanking voltage from transistors 80 and 82, the base of transistor 56 is no longer clamped to ground voltage. As a result, the voltage applied to the base of transistor 56 becomes the output time changing voltage of operational amplifier 36. Blanking circuit 90 is conventional in that it consists of an integrated circuit timer for controlling an appropriate driving voltage. When the timer reaches a predetermined count, the blanking voltage is removed.

The function of the blanking circuit is best illustrated by observing curves C and F in FIGS. 2 and 3, respectively. As shown, curve C is held at a fixed voltage (ground) for approximately 9 seconds. In a like manner curve F is shown held at ground voltage for approximately 9 seconds and then released. The advantage of holding these curves at ground voltage is to avoid circuit transients created by the initial turbulence when the reagent is first added to the plasma. Thus, the output voltage is given an opportunity to settle down to a reasonably steady value which is well below the voltage level set into the base of transistor 58 by potentiometer 60. It has been found that 9 seconds is sufficient amount of time to accomplish this function.

As shown in FIG. 1 potentiometer 60 is connected between ground and resistors 92 and 94. Resistor 92 is connected to capacitor 96 which in turn is connected to ground. In a like manner, resistor 94 is connected to capacitor 98 which is connected to ground. Capacitors 96 and 98 filter out noise from the circuit. Switch 100 connects either resistor 92 or resistor 94 in series with potentiometer 60 and to the power supply for appropriately biasing the base of transistor 58. As indicated, the resistor 92 provides a gross adjustment for use of the apparatus with an oxalate plasma. Resistor 94 provides a gross adjustment for use of the circuit 10 with a citrate plasma. Fine adjustment is provided by potentiometer 60.

From the foregoing it should be apparent that the apparatus described in FIG. 1 provides a new and unobvious means and method for measuring blood coagulation time. In operation, the test tube 12 is positioned between the source 16 and photocell 18. Thereafter a reagent is added to the plasma within the test tube and a start switch (not shown) is simultaneously operated. The start switch may be part of an automatic pipette used to add plasma to the reagent (or reagent to the plasma). The output voltage of photocell 18 is differentiated, amplified and applied to the base of transistor 56. However, blanking circuit 90 together with the back-to-back transistors 80 and 82 hold this voltage at ground or some other preselected steady state value during the initial portion of the coagulation time period. After the initial period the blanking circuit 90 removes the saturating voltage from the transistors 80 and 82. This initial time period is preferably approximately 9 seconds although it may be adjusted as desired. Thereafter, the voltage applied to the base of transistor 56 is a time changing voltage as coupled in by capacitor 50. However, the nature of the difference amplifier comprising transistors 56 and 58 is such that it only reads the difference level of the voltage applied to the base of transistor 56. Thus, the circuit avoids the problem of evaluating the slow changing curve representing the first differential of the photocell voltage. When the voltage level applied to base 56 exceeds the predetermined voltage value applied to the base of transistor 58, transistor 74 conducts, a square wave voltage is generated and counter 78 turns off. Counter 78 thereafter can be read to determine the coagulation time.

As previously stated, a circuit constructed in accordance with the foregoing principles is capable of detecting the clotting time with more accuracy and much earlier than previously known apparatus. By holding the level applied to the difference amplifier at zero for a predetermined amount of time, all turbulence and other extraneous factors are removed from the curve. Thus, when the timer is triggered to an off condition, the user can be certain that the actual clotting time rather than some extraneous factor has been measured. Moreover, there is no need to be concerned with whether the signal is going from positive to negative or negative to positive.

Figure 4:
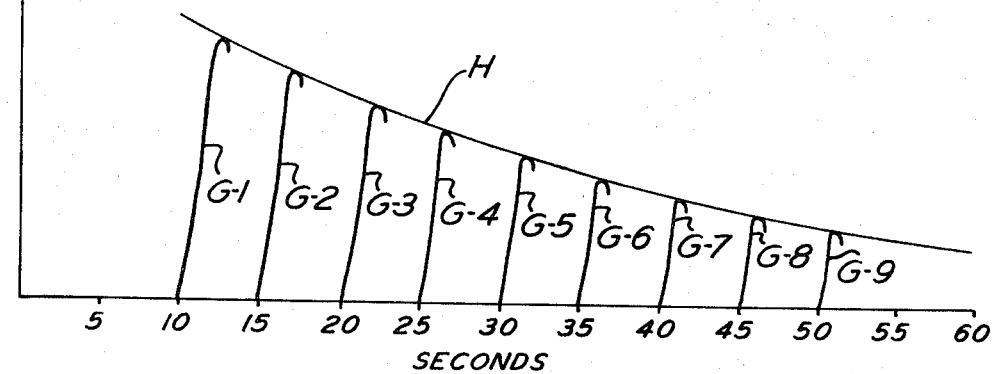
FIG. 4 is a family of curves derived from a timing apparatus.

Referring now to FIG. 4, there is shown a family of curves G-1 - G-9 representing the signal applied to the base of transistor 56. This signal, it should be noted, decreases in amplitude as time progresses. Thus, the end point time for normal blood in a 10 to 15 second range is much easier to detect than the end point time for blood in the 50 second range where the amplitude of the signal is so much lower. This is of course a direct result of the fact that the change in the optical transmission quality of the blood plasma at the end point time is much smaller than for normal blood. The curvage drawn tangent to the family of curves G-1 - G-9 illustrates how the level of the signal decreases at a substantially asymptotic rate. Moreover, it should also be noted that each of the signals G-1 - G-9 is a rather quick rise time.

Because of the reduction in signal intensity, it is advantageous to start with a rather high level signal at the base of transistor 58 and then successively reduce that level as time progresses. Thus, the circuit is made even more accurate in measuring signal levels for long coagulation times.

Figure 5:
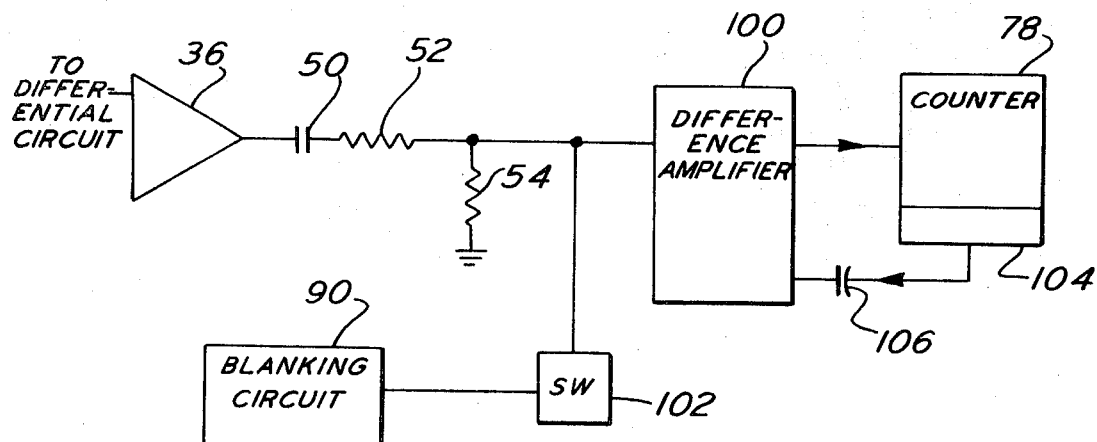
FIG. 5 is a modification to the timing apparatus.

The circuit illustrated in FIG. 5 provides such a means for reducing the level of the voltage applied to the base of transistor 58. Since the circuit incorporates substantial portions of what is illustrated in FIG. 1, only so much as is necessary to explain the modification is illustrated.

As shown, the output of the differentiating circuit is amplified by the amplifier 36 and coupled to the difference amplifier 100 by the capacitor 50. In a like manner, the blanking circuit 90 applies a signal through the saturated control switch 102 as previously explained with respect to the circuit illustrated in FIG. 1. Moreover, the difference amplifier 100 is substantially the same as that illustrated in FIG. 1 with the exception that the voltage level control applied to the base of transistor 58 is now derived in the counter 78.

In the preferred embodiment, the counter 78 is a four stage binary counter such as is well known in the art. Such a binary counter may consist of four decade counters controlling BCD to decimal drivers as is well known in the art. The voltage output of each stage of the binary counter can be applied successively to series connected resistors 104 so as to continuously drop the voltage level as the count progresses. The net result is a step-like asymptotic signal. This signal can be applied to the capacitor 106 so that a rather smooth asymptotic curve similar to the curve H in FIG. 4 is applied to the difference amplifier 100. As a result, the voltage level which must be exceeded by the signal derived from amplifier 36 is successively reduced as time progresses. Thus, the circuit becomes much more sensitive for longer clotting times as required.

The present invention may be embodied in other specific forms without departing from the spirit or essential attributes thereof and, accordingly, reference should be made to the appended claims, rather than to the foregoing specification as indicating the scope of the invention.

We claim:

1. Apparatus for determining coagulation time of blood plasma comprising a source of light, a transducer responsive to said light, means for positioning said plasma between said source and said transducer, differentiation means for differentiating the signal output of said transducer, amplifying means for amplifying the differentiated signal, a difference amplifier, means for generating a comparison signal, said comparison signal being coupled into said difference amplifier, means for coupling a time changing component of the amplified differential signal into said difference amplifier, means for holding said component below the level of said comparison signal for a preset amount of time and then releasing said signal, and means to indicate coagulation time responsive to the output signal of said difference amplifier when the value of said component exceeds the value of the comparison signal.

2. Apparatus for determining coagulation time of blood plasma in accordance with claim 1 wherein said means responsive to the output signal of said difference amplifier comprises means for generating a signal to stop a timer.

3. Apparatus for determining coagulation time of blood in accordance with claim 1 wherein said means for holding said component below said comparison signal comprises a blanking circuit and switch for holding said component at ground potential.

4. Apparatus for determining coagulation time of blood in accordance with claim 3 wherein said means for holding said component below said comparison signal value for a preset amount of time and then releasing said signal includes a timer, said timer being set to time out and release said component of a signal after initial disturbances in the differentiated signal have ceased.

5. Apparatus for determining coagulation time of blood plasma in accordance with claim 1 wherein said means for generating a comparison signal includes means for adjusting the comparison signal value as a function of time.

6. Apparatus for determining coagulation time of blood plasma in accordance with claim 5 wherein said means for generating a comparison signal includes means for presetting the comparison value depending upon the type of reagent mixed with the blood plasma at the commencement of the timing period.

7. A method for determining coagulation time of blood plasma comprising the steps of passing light through a mixture of blood plasma and reagent, sensing the light so passed through the blood plasma and reagent, transducing the light so sensed into an electric signal, differentiating said electric signal, sensing a time changing component of said signal, comparing said component of said signal to a comparison signal, and measuring the time it takes for the value of said component of said differentiated signal to exceed said comparison signal.

8. A method for determining coagulation time of blood plasma in accordance with claim 7 including the steps of successively changing the comparison signal as a function of time.

9. Apparatus for determining coagulation time of blood plasma comprising a source of light, a transducer responsive to said light, means for positioning said plasma between said source and said transducer, differentiating means for differentiating the signal output of said transducer, amplifying means for amplifying the differentiated signal, a difference amplifier, means for generating a comparison signal, said comparison signal being coupled into said difference amplifier, means for coupling a time changing component of the amplified differential signal into said difference amplifier, and means to indicate coagulation time, said means to indicate coagulation time being responsive to the output signal of said difference amplifier when the value of said component exceeds the value of the comparison signal.

10. A method for determining coagulation time of blood plasma comprising the steps of passing light through a mixture of blood plasma and reagent, sensing the light energy so passed through the blood plasma and reagent, transducing the light so sensed into an electric signal, differentiating said signal, sensing a time changing component of said signal, and determining the coagulation time of the blood plasma by sensing when said time changing component of said signal exceeds a predetermined value.

* * * * *